Patented May 22, 1945

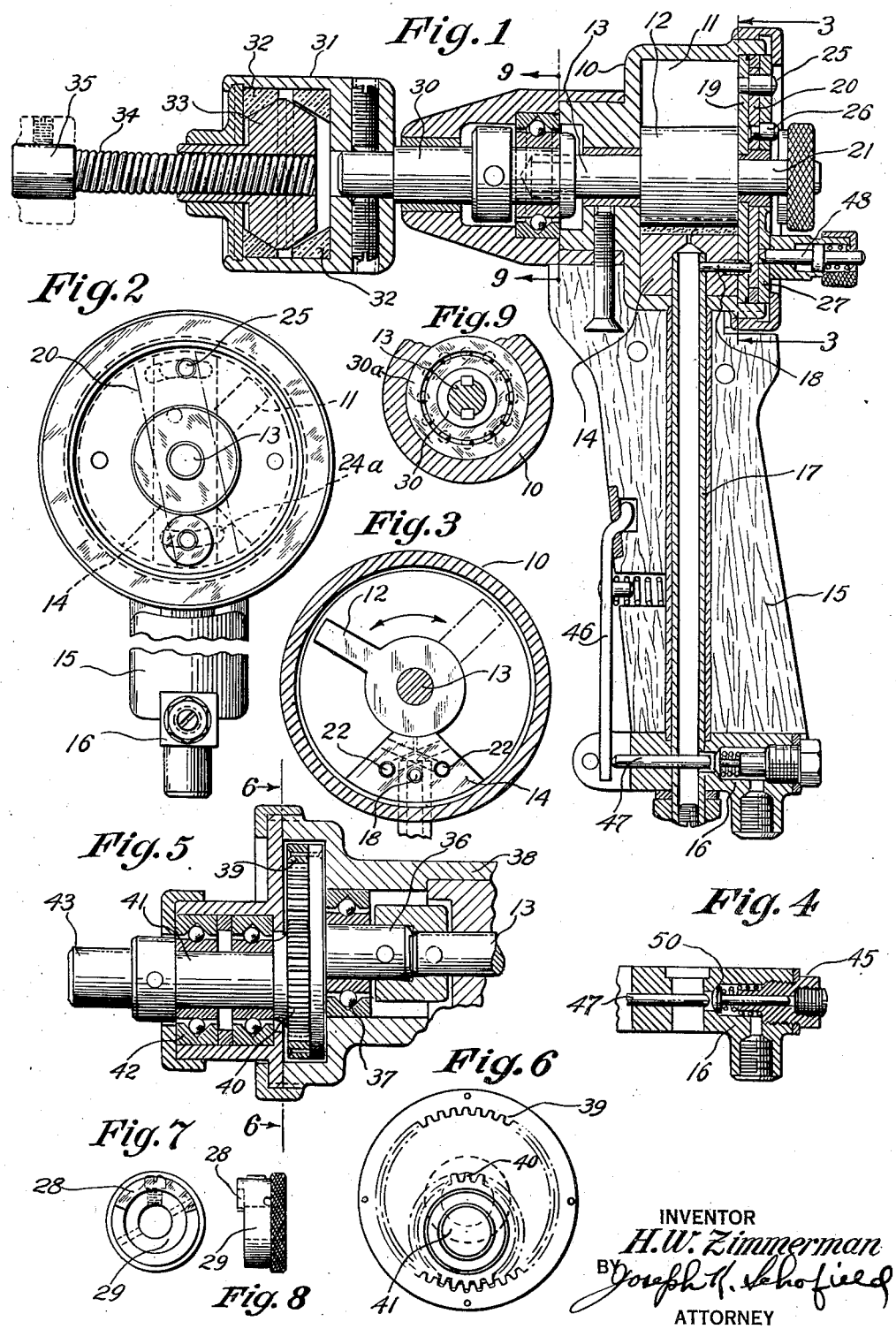

2,376,746

UNITED STATES PATENT OFFICE 2,376,746

PNEUMATIC VALVE LAPPING TOOL

Herman W. Zimmerman, North Newington, Conn.

Application June 25, 1943, Serial No. 492,289

4 Claims. (Cl. 51—29)

This invention relates to pneumatic tools and particularly to a tool of that type adapted primarily for lapping the valves and valve seats of internal combustion engines while in place within the engine.

An object of the present invention is to provide an improved tool adapted to contact a valve while in position against its seat and oscillate the valve relative to its seat while an abrasive compound is applied to the contacting surfaces of the valve and seat, the valve being periodically lifted from its seat and again oscillated in successively different rotative positions.

A feature of the invention that enables the above object to be accomplished is that a friction clutch is interposed between an oscillating shaft and the tool holding spindle, this clutch being engageable by axial movement of the tool and its spindle toward and away from the valve operated shaft of the air operated tool.

Another object of the invention is to provide a driving means for the spindle in the form of an air operated motor or engine having an oscillating piston the oscillatory movement of which may be adjusted over a wide range so that the tool may be similarly limited as to its oscillatory movement.

Other objects and advantages will be apparent from the specification and claims, and from the drawings which illustrate what is now considered to be a preferred embodiment of the invention.

In the accompanying drawing annexed hereto and forming a part of this specification, I have shown the invention embodied in a hand tool of relatively small size but it will be understood that the drawing is not to be construed as defining or limiting the scope of the invention, the claims appended to this specification being relied upon for that purpose.

In the drawing:

Figure 1 is a complete longitudinal view in section of a tool made in accordance with the present invention.

Fig. 2 is an end view of the cylinder and piston for oscillating the tool spindle.

Fig. 3 is a sectional view taken on the plane of line 3—3 in Fig. 1.

Fig. 4 is a cross sectional view of the throttle vavle and means to limit the amount of opening.

Fig. 5 is a longitudinal sectional view of a speed changing connection between the oscillating piston rod and the tool holding spindle.

Fig. 6 is a sectional view taken on the plane of line 6—6 of Fig. 5.

Figs. 7 and 8 are front and side views of one of the details of the mechanism, and Fig. 9 is a cross sectional view taken on the plane of line 9—9 in Fig. 1.

In the above-mentioned drawing there has been shown but one embodiment of the invention which is now deemed preferable, but it is to be understood that changes and modifications may be made within the scope of the appended claims without departing from the spirit of the invention.

Briefly and in its broadest aspect, my invention may include the following principal parts: First, a body member having a cylindrical recess therein; second, an oscillatable piston within the recess having a piston rod extending therefrom; third, valve mechanism controlling admission of a fluid under pressure to the recess or cylinder to actuate said piston and rod; fourth, a friction clutch mounted on the free end of said piston rod; and fifth, flexible connecting and tool mounting means extending from said friction clutch, there being preferably a speed changing mechanism between the spindle or rod and the friction clutch and the tool mounting member.

Referring more in detail to the figures of the drawing, and first to Fig. 1, a body member 10 is provided with a cylindrical recess 11 within which a piston 12 oscillates and with a hole concentric with the recess 11 through which extends a piston rod or spindle 13 preferably formed integrally with the piston. To oscillate the piston 12 air under pressure is admitted to a member 14 held in fixed position within the recess 11 preferably through a handle secured to and extending from the body member 10.

As shown in Fig. 1 an air connection may extend longitudinally through a tool handle 15 and past a manually controlled throttle valve 16 to an elongated tube 17 extending axially through the handle 15 to the member 14 into which the tube may extend. From this inner end of the tube 17 air under pressure is admitted to a short transverse tube 18 within member 14 to the outer face thereof. A plate 19 fits against the end face of the member 14 and closes the recess 11. Preferably the tube 18 extends through the plate 19. An oscillating valve plate 20 bears against the outer surface of the closure plate 19 and is mounted to oscillate about the axis of the recess 11. For this purpose the valve plate 20 has a central opening closely fitting the central extension 21 of the piston 12 and rod 13. An arcuate groove 21ᵃ is cut into the inner face of the valve plate 20 so that in either oscillated position of the plate 20 the central air supply tube 18 is connected with one or the other of lateral openings 22 connecting with opposite angular faces of the fixed member 14. Air therefor may enter the tube 17 and be admitted to the cylinder 11 on opposite sides of the oscillating piston 12. To limit the movement of the valve plate 20 an arcuate slot is cut therein through which extends a short stud 25 outstanding from the cover plate 19. To actuate the valve 20 a short stud 26 is provided in the valve plate and extends through an outer plate 27. This stud 26 is struck by the end walls of a flange 28 on a collar 29 secured in fixed position on the outer end of rod 21 so that it oscillates with the spindle 13 and the piston 12. By varying the relative positions of the end walls for flange 28, the amount of movement of the piston can be widely varied.

The throttle valve 16 shown more clearly in Fig. 4 has its valve member 50 spring pressed toward its closed position and is prevented from opening beyond a predetermined position by means of a stem on the valve entering an opening through the plug member 45 which closes the valve chamber of the throttle. A short screw threaded into this plug member controls the maximum opening of the valve 50. A manually operated lever 46 retained within the handle 15 and engaging against a short pin 47 may be depressed to a position to gradually open the valve 50.

To resiliently retain the valve plate 20 in its operative positions a spring pressed detent 48 is provided mounted on the cover plate 27. This detent bears against the outer surface of the valve plate 20 which may be provided with depressions into which a portion of the detent may extend.

Mounted in alinement with the axis of the piston rod 12 is a connection 30 rotatably mounted within the body member 10 and extending forwardly from this member. Preferably an anti-friction bearing 30ᵃ is provided for the spindle 30 and the piston rod 13 and spindle 30 are keyed together as shown in Fig. 9. Secured to the outer end of member 30 is a friction clutch body 31 within which are opposite rings of friction material 32. Between these rings 32 is disposed the head 33 of a tool connecting member 34. The tool connecting member 34 may comprise a flexible shaft-like section to which the head 33 at one end is fastened and to the opposite end of which the chuck or tool holder 35 may be secured. By forcing the tool forwardly or rearwardly relative to the tool holding member 34 one or the other of the bevelled surfaces of the head 33 will engage the surface of one of the rings 32 and thus force the tool holding member and tool attached thereto to oscillate with the piston rod 13 and piston 12.

In some instances it may be desired to change the speed of oscillation of the tool holder 35 relative to the piston 12. One of these speed changing devices is shown in Figs. 5 and 6. For this purpose a connecting member 36 having a large internal gear thereon is attached by a pin and groove connection to the rod 13. This member 36 may oscillate within an anti-friction bearing 37 housed within a fixture 38 secured to or forming the inner end of the body member 10. Meshing with the teeth of the internal gear 39 on the connecting member 36 is a smaller gear 40 on a spindle 41 housed in a part of the fixture 38 and mounted on bearings 42. On the forward end 43 of the spindle 41 the housing 31 for the friction clutch may be attached. By choosing the proper gears in the speed changing device the angular movement and speed of oscillation of the tool holding member 34 may be varied and either increased or decreased relative to the piston rod 13.

In operation the tool holder 35 is fastened in any convenient manner to the valve stem to be lapped while in position against its valve seat. The piston is then actuated, which oscillates the valve while bearing against its valve seat. While operating on radial engines some of the valves and valve seats may be lapped while forcing the head 33 against one of the friction rings 32 and other valves may be lapped while the head 33 is held against the opposite ring.

As the holder 35 is flexibly connected to the piston 12 and its rod 13 by the friction clutch 33, the valve being lapped may have variable lengths of movements relative to the length of movement of the piston rod 13. By axially forcing the pneumatic tool forward or in a direction to press the valve against its seat during portions of the alternating oscillatory movements of the piston rod 13 the valve may be given any desired movements and with the valve being lapped in variable angular relationship to the valve seat against which it bears. By this means the lapping action can be made uniform about the valve and valve seat and this action will cause the valve to properly engage its seat in any angular position.

I claim as my invention:

1. A tool having a body member, an oscillating piston therein, means to actuate said piston, a spindle connected to and oscillated with said piston, a frictional driving member mounted at the outer end of said spindle, said driving member having opposed conical surfaces selectively engageable with corresponding conical surfaced members within a head mounted on the end of said spindle, and a resilient coiled spring attached at one end to said driving member and having tool attaching means at its opposite end, whereby a tool mounted within said attaching means may be angularly adjusted in any direction while being oscillated.

2. A pneumatic tool having a body member, an oscillating piston therein, pneumatic means to actuate said piston, a spindle connected to and oscillated with said piston, a frictional driving member mounted at the outer end of said spindle, said driving member having opposed conical surfaces selectively engageable with corresponding conical surfaced members within a head mounted on the end of said spindle, and a resilient coiled spring attached at one end to said driving member and having tool attaching means at its opposite end, whereby a tool mounted within said attaching means may be angularly adjusted in any direction while being oscillated.

3. A tool having a body member, an oscillating piston therein, means to actuate said piston, means to vary the extent of angular movement of said piston, a spindle connected to and oscillated with said piston, a frictional driving member mounted at the outer end of said spindle, said driving member having opposed conical surfaces selectively engageable with corresponding conical surfaced members within a head mounted on the end of said spindle, and a resilient coiled spring attached at one end to said driving member and having tool attaching means at its opposite end, whereby a tool mounted within said attaching means may be angularly adjusted in any direction while being oscillated.

4. A pneumatic tool having a body member, an oscillating piston therein, pneumatic means to actuate said piston, a spindle connected to and oscillated with said piston, a frictional driving member mounted at the outer end of said spindle, said driving member having opposed conical surfaces selectively engageable with corresponding conical surfaced members within a head mounted on the end of said spindle when said body member is forced axially toward or from said driving member, and a helically wound spring attached at one end to said driving member and having tool attaching means at its opposite end.

HERMAN W. ZIMMERMAN.